No. 634,664. Patented Oct. 10, 1899.
V. A. GATES.
SHALLOW WATER PROPELLER.
(Application filed Sept. 21, 1898.)
(No Model.)
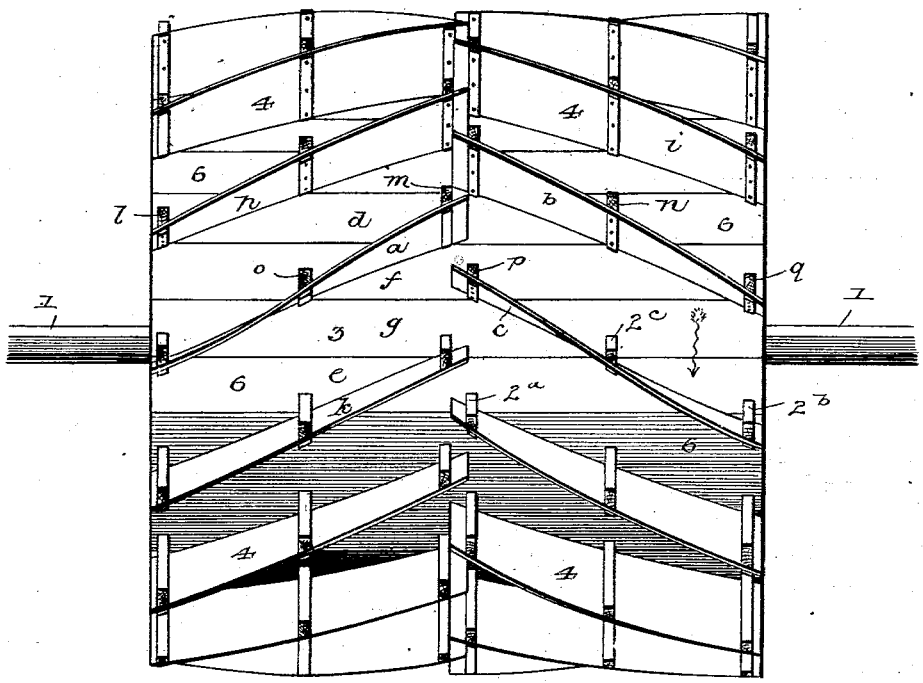
Fig. 1.
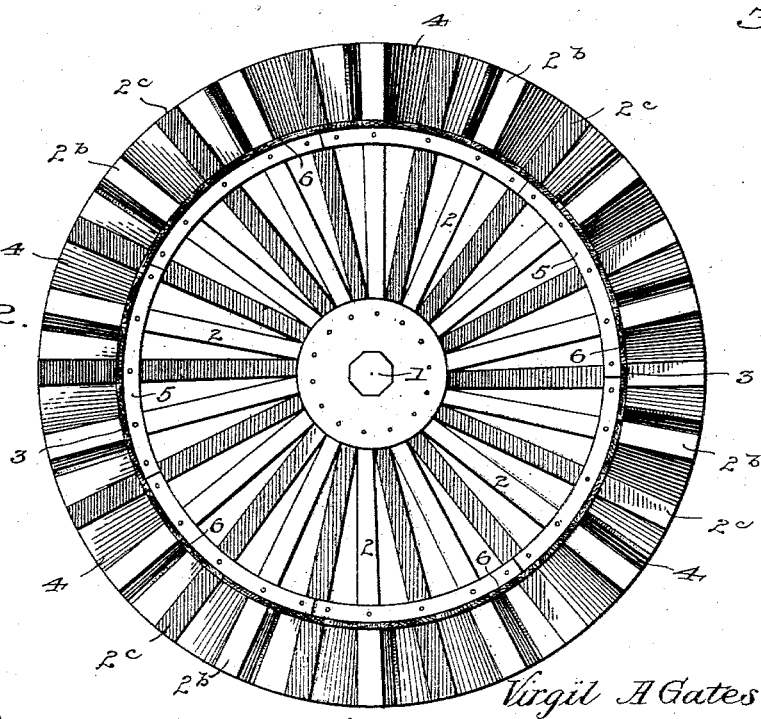
Fig. 2.
Witnesses
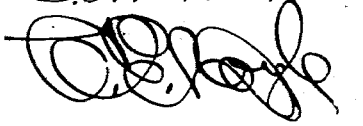
Virgil A Gates Inventor
By his Attorneys.

UNITED STATES PATENT OFFICE.

VIRGIL A. GATES, OF CHARLESTON, WEST VIRGINIA.

SHALLOW-WATER PROPELLER.

SPECIFICATION forming part of Letters Patent No. 634,664, dated October 10, 1899.

Application filed September 21, 1898. Serial No. 691,529. (No model.)

*To all whom it may concern:*

Be it known that I, VIRGIL A. GATES, a citizen of the United States, residing at Charleston, in the county of Kanawha and State of West Virginia, have invented a new and useful Shallow-Water Propeller, of which the following is a specification.

My invention relates to paddle-wheels, and particularly to a propeller for floating craft, the same being adapted to operate efficiently and economically in shallow water and where only a portion of the wheel can be submerged; and the objects in view are to provide such a construction and relative arrangement of paddles or blades as to concentrate the liquid, whereby the maximum resistance may be offered to the movement of the wheel through the water, to provide means whereby the overflowing or flooding of the paddles or blades, and hence the congestion of the wheel, may be prevented, and, furthermore, to provide in a wheel having diagonally-disposed blades means for preventing the lateral straining and separation of the parts of the wheel.

Further objects and advantages of this invention will appear in the following description, and the novel features thereof will be particularly pointed out in the appended claims.

In the drawings, Figure 1 is a front view of a propeller constructed in accordance with my invention. Fig. 2 is an end view of the same.

Similar numerals and letters of reference indicate corresponding parts in both figures of the drawings.

The wheel embodying my invention consists, essentially, of a shaft 1, from which radiate spokes 2, carrying a cylindrical shell 3, beyond which and attached to extensions of the spokes are arranged the diagonally-disposed paddles or blades 4.

I prefer in practice to arrange my improved propeller in the position of a stern-wheel and so mount it that a plurality of the paddles or blades will be simultaneously submerged, and in order that the concentration of the liquid at the center of the wheel may be accomplished, I dispose the blades in two parallel annular series, with the blades in each series disposed diagonally with relation to the axis of rotation and with their outer extremities or, in advance of their inner extremities or, in other words, inclining rearwardly toward their inner ends, as will be seen by reference to Fig. 1, wherein the arrow indicates the direction of rotation of the wheel in operation. The two parallel series of blades are preferably carried by a common frame, with the inner ends of the blades in the two series alternately disposed—that is, with the inner extremity of a blade in one series located midway between the inner ends of adjacent blades in the other series and with said inner extremities of the blades in the two series overlapping or extending, respectively, beyond a line arranged in a plane midway between the centers of the two series of blades. My object in thus overlapping the inner ends of the blades or extending them respectively beyond a common center line of the propeller is to avoid forming a central unobstructed passage through which water may pass to relieve the pressure at the center of the wheel. By overlapping the inner extremities of the blades while not arranging the said inner extremities in contact I provide for relieving the pressure sufficiently to avoid congesting the wheel without losing any of the effective pressure of the blades upon the water. The wheel will relieve itself of the water at the proper time, as after each blade has accomplished its desired function; but while a blade is in operation it will have the maximum efficiency of pressure upon the liquid. Also by inclining the blades from their outer ends rearwardly toward their inner ends (it will be understood that the references "forwardly" and "rearwardly" are applied with relation to the direction of movement of the wheel and not to the direction of movement of the boat or other craft in connection with which the wheel may be used) the water is gathered from the ends of the wheel and is forced inwardly toward the center thereof, whereby there is a tendency to condense the liquid at the center of the wheel and cause the surplus water thus gathered to pass downwardly in escaping from the paddles or blades, whereby lateral deflection of the water and hence relief of the pressure are avoided and the maximum efficiency is attained. This tendency toward condensation (it being well understood that water is a practically incompressible fluid) is accomplished without the overflowing or flooding of the blades by reason of the use in connection with the diagonally-disposed blades of the shell 3, in contact with which the inner edges of the blades or those edges toward the axis of movement are arranged, it being well known that without the use of a shell the tendency of the water toward the center of the wheel by reason of the diagonal disposition of the blades will cause the water to rise at the inner ends of the blades, and thus congest the wheel and interfere with the efficient purchase of the blades upon the water. It is my object to condense the water as far as practicable toward the center of the wheel while preventing this congestion, and I have found that by the use of the shell I cause the surplus water to pass downwardly from the wheel instead of upwardly over the paddles, and thus tend to increase the density of the liquid and add to rather than detract from the efficient pressure of the paddles upon the water.

In developing my invention I have adopted a certain peculiar construction and relative arrangement of parts particularly adapted for giving the necessary strength to the wheel and insuring the operation of the same under conditions involving a severe test without the tendency of tearing the wheel apart by reason of the above-described gathering of the water from the sides toward the center. It will be understood that the diagonal disposition of the blades exercises a powerful lateral strain upon the wheel, and unless the construction is adapted to resist this strain there is liability of separation of the wheel upon a line between the two parallel series of blades. Hence in practice I employ for each blade a plurality of spokes which in the following description I will refer to as "inner" and "outer" spokes $2^a$ and $2^b$ and an "intermediate" spoke $2^c$, the intermediate spoke $2^c$ being arranged in a plane midway between the planes of the inner and outer spokes and the inner spokes of the two series of blades being arranged in adjacent parallel planes, whereby the extension of the blades slightly beyond their inner spokes causes the above-described overlapping of their extremities, which secures the discharge of the water from the operative face of a blade of one series upon the operative face of an adjacent blade of the other series. In order that the above-described diagonal position of the blades may be attained, the inner and outer and intermediate spokes to which a blade is attached are arranged with their outer ends upon a diagonal line or a line which is disposed diagonally with relation to the direction of movement of the surface of the wheel or, in other words, to the path of the blades, and the rigidity of the structure is increased by attaching the blades to portions of the spokes which are extended through and beyond the shell 3. Obviously the blade should be arranged in contact with the front sides of the spoke extensions, whereby said spoke extensions may receive the back pressure of the blades.

The shell consists of annular ribs or rings 5, attached to the spokes at intermediate points of the latter, and slats or staves 6, secured to the exterior surfaces of the ribs or rings and extending transversely or parallel with the axis of the wheel, each slat being of a width less than the angular distance between the front and rear edges of a blade, whereby each blade overlaps or is arranged at its inner edge in contact with a plurality of slats. In practice, and in order to simplify the construction of the wheel and at the same time insure the maximum strength, I use a width of slat which is equal to the angular interval between each terminal spoke $2^a$ or $2^b$ and the intermediate spoke $2^c$ of the same series and arrange the inner spokes of the two series at an angular interval corresponding with the angular interval between a terminal spoke and the intermediate spoke of each series. In other words, the interval between the inner terminal spokes of each series is equal to the combined width of two slats, and arranged between these two inner spokes of the same series is an inner spoke of the other series. Each slat is notched at its forward edge to receive a plurality of the projecting portions of the spokes, and by the above-described arrangement of spokes it will be seen that each slat is provided with notches for engaging three spokes—namely, two spokes of one series and one spoke of the other—and while one slat is positively engaged with two spokes of a given series and one spoke of the other series the next slat is engaged with only one spoke of the first-named series and two spokes of the second-named series. Thus a strong interlocking connection is provided between the two parts or members, so to speak, of the wheel, and as each slat is continuous from one end of the wheel to the other by preference the straining apart of the two members or sections is effectually prevented.

In the construction illustrated each spoke supporting a given blade is engaged by a notch formed in a different slat, whereby the strain applied to a given blade and communicated, obviously, to the spokes supporting the same is not communicated to the same slat, but to three different slats, and as the extremities of each blade are extended beyond the terminal spokes to which said blade is attached it will be seen that each blade overlaps or lies at its inner edge in contact with four slats, and at the same time it will be seen that each slat is overlapped by four different blades or by two blades in each series, the points of contact of said two blades with a common slat being spaced apart, whereby the slats and blades mutually support each other. Taking the blade, $a$ for example, it will be seen that it is arranged at its inner end between the inner extremities of the blades $b$ and $c$ of the other series, terminally overlaps the slats $d$ and $e$, and at intermediate points lies at its inner edge in contact with the slats $f$ and $g$, said slat $d$ being also overlapped by the inner edge of the blade $h$ of the same series as the blade $a$ and having in contact therewith the inner edge of the blade $b$ of the other series, and, furthermore, said slat $d$ is overlapped by the outer portion of the edge of the blade $i$, which is in the same series with the blade $b$. Thus the slat $d$ is overlapped by the blades $h\ a\ b\ i$, two of which are in each series. The slat $f$ is overlapped by the blades $a, k, c$, and $b$, the blades $a$ and $k$ being in one series and the blades $c$ and $b$ in the other series; but while the slat $d$ is engaged with the terminal inner and outer spokes $l$ and $m$ of one series and the intermediate spoke $n$ of the other series the next slat $f$ is engaged with the intermediate spoke $o$ of the first-named series and the terminal inner and outer spokes $p$ and $q$ of the second-named series.

From the above description it will be seen that the strongly-interlocked construction of the wheel embodying my invention is adapted for resisting the various strains, longitudinal and transverse, to which a device of this class is subjected in operation and that by reason of the relative disposition of the blades in the two series an efficient purchase of said blades upon the water is insured to economize power in the propulsion of a craft without causing the slap of the blades in coming in contact with the water, as when the blades are arranged transversely to their direction of movement, and hence without causing the jarring and vibration of the craft, which is objectionable in connection with a transversely-bladed paddle-wheel, such vibration resulting in the present practice in an early depreciation in the value of the craft.

Various changes in the form, proportion, and the minor details of construction may be resorted to without departing from the spirit or sacrificing any of the advantages of this invention.

Having described my invention, what I claim is—

1. A shallow-water propeller having a shaft, radial spokes arranged in parallel transversely-spaced series, parallel series of diagonally-disposed blades secured to the outer ends of the spokes, and transversely-disposed means, connecting the spokes for preventing lateral displacement thereof, and consisting of slats arranged in contact with the inner edges of the blades and combining to form a cylinder, substantially as specified.

2. A shallow-water propeller having spokes arranged in parallel series, and each series having spokes arranged in parallel inner, outer and intermediate planes, diagonally-disposed blades, each of which is secured to spokes in the inner, outer and intermediate planes of a series, and a shell, arranged in contact with the inner edges of said blades, consisting of slats, each of which is engaged with a spoke in each series, substantially as specified.

3. A shallow-water propeller having spokes arranged in parallel series, and each series having spokes arranged in parallel inner, outer and intermediate planes, diagonally-disposed blades, each of which is secured to spokes in the inner, outer and intermediate planes of a series, and a shell arranged in contact with the inner edges of the blades, and consisting of slats arranged parallel with the axis of the wheel, each slat being engaged with spokes in both series, substantially as specified.

4. A shallow-water propeller having spokes arranged in parallel series, and each series having spokes arranged in parallel inner, outer and intermediate planes, diagonally-disposed blades, each of which is secured to spokes in the inner, outer and intermediate planes of a series, and a shell arranged in contact with the inner edges of said blades, and consisting of slats, each of which is overlapped by a plurality of blades, substantially as specified.

5. A shallow-water propeller having spokes arranged in parallel series, and each series having spokes arranged in parallel inner, outer and intermediate planes, diagonally-disposed blades, each of which is secured to spokes in the inner, outer and intermediate planes of a series, and a shell arranged in contact with the inner edges of said blades, and consisting of slats each of which is notched to engage a plurality of spokes, substantially as specified.

In testimony that I claim the foregoing as my own I have hereto affixed my signature in the presence of two witnesses.

VIRGIL A. GATES.

Witnesses:
WALTER L. ASHBY,
C. C. WATTS.